(12) United States Patent
Liu et al.

(10) Patent No.: US 11,522,665 B2
(45) Date of Patent: Dec. 6, 2022

(54) FEEDBACK TRANSMISSIONS FOR MIXED SERVICES

(71) Applicant: Telefonaktiebolaget LM Ericsson (publ), Stockholm (SE)

(72) Inventors: Jinhua Liu, Beijing (CN); Min Wang, Luleå (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 882 days.

(21) Appl. No.: 16/316,035

(22) PCT Filed: Nov. 13, 2018

(86) PCT No.: PCT/CN2018/115198
§ 371 (c)(1),
(2) Date: Jan. 7, 2019

(87) PCT Pub. No.: WO2019/096118
PCT Pub. Date: May 23, 2019

(65) Prior Publication Data
US 2021/0376987 A1    Dec. 2, 2021

(30) Foreign Application Priority Data

Nov. 14, 2017    (CN) .................. PCT/CN2017/110887

(51) Int. Cl.
*H04L 5/00*    (2006.01)
*H04W 72/08*    (2009.01)

(52) U.S. Cl.
CPC .......... *H04L 5/0055* (2013.01); *H04W 72/087* (2013.01)

(58) Field of Classification Search
CPC ............... H04W 72/1273; H04W 4/00; H04W 72/1205; H04W 72/1226; H04W 72/1231;
(Continued)

(56) References Cited

U.S. PATENT DOCUMENTS 9,578,640 B1 *   2/2017 Singh ................. H04L 1/1812
2015/0373713 A1  12/2015 Oh et al.
(Continued)

FOREIGN PATENT DOCUMENTS

CN    105577331 A    5/2016
CN    106788918 A    5/2017
(Continued)

OTHER PUBLICATIONS

Communication pursuant to Article 94(3) EPC, EP App. No. 18819519.2, dated Feb. 4, 2020, 6 pages.
(Continued)

*Primary Examiner* — Dady Chery
(74) *Attorney, Agent, or Firm* — Nicholson De Vos Webster & Elliott LLP

(57) ABSTRACT

A method for communications comprising obtaining configuration information from a network node. The configuration information is related to resource configurations of feedback transmissions with respect to data transmissions from the network node to the terminal device for different types of services. The method further comprises determining a correspondence between the resource configurations and the different types of services based at least in part on the configuration information.

25 Claims, 10 Drawing Sheets

(58) Field of Classification Search
CPC ............ H04W 72/1236; H04W 72/087; H04L 65/4069; H04L 67/2842; H04L 47/2416; H04L 47/30; H04L 47/80; H04L 5/0055; H04L 5/0057; H04N 21/26208
See application file for complete search history.

(56) References Cited

U.S. PATENT DOCUMENTS

2019/0174520 A1* 6/2019 Pang ................ H04W 4/00
2019/0327747 A1* 10/2019 Yang ............... H04W 28/0289

FOREIGN PATENT DOCUMENTS

| CN | 107113122 A | 8/2017 |
|---|---|---|
| EP | 3190736 A1 | 7/2017 |

OTHER PUBLICATIONS

International Preliminary Report on Patentability (Chapter II), PCT App. No. PCT/CN2018/115198, dated Mar. 1, 2020, 31 pages.
Office Action, CN App. No. 201880002928.X, dated Sep. 15, 2020, 16 pages.
Huawei, HiSilicon, "NR-PUCCH Resource Determination", 3GPP TSG RAN WG1 Meeting #88bis, R1-1704211, Apr. 3-7, 2017, 4 pages.
International Search Report and Written Opinion received for PCT Patent Application No. PCT/CN2018/115198, dated Feb. 2, 2019, 7 pages.
Nokia Alcatel-Lucent Shanghai Bell, "On low-latency UCI transmission", 3GPP TSG RAN WG1#89, R1-1708519, May 15-19, 2017, 2 pages.
Supplementary European Search Report and Search Opinion Received for EP Application No. 18819519.2, dated Sep. 12, 2019, 10 pages.
Communication pursuant to Article 94(3) EPC, EP App. No. 18819519.2, dated May 4, 2021, 7 pages.
Examination Report, IN App. No. 201947000102, dated Feb. 5, 2021, 6 pages.
Office Action, CN App. No. 201880002928.X, dated Jan. 28, 2021, 14 pages.
Notification of Reexamination, CN App. No. 201880002928.X, dated Jan. 29, 2022, 8 pages.

* cited by examiner

FEEDBACK TRANSMISSIONS FOR MIXED SERVICES

CROSS-REFERENCE TO RELATED APPLICATIONS

This application is a National stage of International Application No. PCT/CN2018/115198, filed Nov. 13, 2018, which claims priority to International Application No. PCT/CN2017/110887, filed Nov. 14, 2017, which are hereby incorporated by reference.

FIELD OF THE INVENTION

The present disclosure generally relates to communication networks, and more specifically, to feedback transmissions in a communication network.

BACKGROUND

This section introduces aspects that may facilitate a better understanding of the disclosure. Accordingly, the statements of this section are to be read in this light and are not to be understood as admissions about what is in the prior art or what is not in the prior art.

Communication service providers and network operators have been continually facing challenges to deliver value and convenience to consumers by, for example, providing compelling network services and performance. With the rapid development of networking and communication technologies, a wireless communication network, such as a long term evolution (LTE)/fourth generation (4G) network or a new radio (NR)/fifth generation (5G) network, may be supposed to support multiple types of services within a common radio access network (RAN), for example, including enhanced mobile broadband (eMBB), massive machine type communication (mMTC) and ultra-reliable and low latency communication (URLLC), etc. Accordingly, a terminal device in the network may receive multiple services at the same time and need to transmit feedback information for the received services. However, multiple services may have different quality of service (QoS) requirements in terms of delay, data rate and packet loss. Thus, it is desirable to improve feedback transmissions for mixed services.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

A wireless communication network such as NR or LTE may support multiple services for a user equipment (UE) with versatile requirements. The network may choose to use different numerologies or transmission durations, for example, for physical downlink shared channel/physical uplink shared channel (PDSCH/PUSCH), to achieve service differentiation. On the other hand, the hybrid automatic repeat request acknowledgement/negative acknowledgement (HARQ A/N) for a PDSCH transmission may be transmitted in uplink via a physical uplink control channel (PUCCH), or multiplexed with the data transmission on a PUSCH. For delay tolerant services, a long PUCCH/PUSCH format with a relative long transmission duration may be acceptable. However, for delay sensitive services, a long PUCCH/PUSCH format with a long transmission duration may be not suitable for HARQ A/N transmission due to a tight delay requirement. Therefore, there may be a need to provide an effective mechanism to implement HARQ A/N transmission framework with differentiation of multiple services.

The present disclosure proposes a feedback transmission mechanism for a communication network, which can enable a terminal device to perform differentiated feedback transmissions in order to fulfill various requirements of multiple services.

According to a first aspect of the present disclosure, there is provided a method performed by a terminal device. The method comprises obtaining configuration information from a network node. The configuration information is related to resource configurations of feedback transmissions with respect to data transmissions from the network node to the terminal device for different types of services. The method further comprises determining a correspondence between the resource configurations and the different types of services based at least in part on the configuration information.

In accordance with an exemplary embodiment, the method according to the first aspect of the present disclosure may further comprise receiving a data transmission for a service from the network node, and identifying a type of the service by using metric information of the received data transmission.

In accordance with an exemplary embodiment, the method according to the first aspect of the present disclosure may further comprise determining a resource configuration of a feedback transmission with respect to the received data transmission, based at least in part on the identified type of the service and the correspondence between the resource configurations and the different types of services. Optionally, the method according to the first aspect of the present disclosure may further comprise performing the feedback transmission according to the determined resource configuration.

According to a second aspect of the present disclosure, there is provided an apparatus. The apparatus comprises one or more processors and one or more memories comprising computer program codes. The one or more memories and the computer program codes may be configured to, with the one or more processors, cause the apparatus at least to perform any step of the method according to the first aspect of the present disclosure.

According to a third aspect of the present disclosure, there is provided a computer-readable medium having computer program codes embodied thereon which, when executed on a computer, cause the computer to perform any step of the method according to the first aspect of the present disclosure.

According to a fourth aspect of the present disclosure, there is provided an apparatus. The apparatus comprises an obtaining unit and a determining unit. In accordance with some exemplary embodiments, the obtaining unit may be operable to carry out at least the obtaining step of the method according to the first aspect of the present disclosure. The determining unit may be operable to carry out at least the determining step of the method according to the first aspect of the present disclosure.

According to a fifth aspect of the present disclosure, there is provided a method performed by a network node. The method comprises determining configuration information which is related to resource configurations of feedback transmissions with respect to data transmissions from the network node to a terminal device for different types of services. The method further comprises providing the configuration information to the terminal device. The configuration information may indicate a correspondence between the resource configurations and the different types of services.

In accordance with an exemplary embodiment, the method according to the fifth aspect of the present disclosure may further comprise performing a data transmission for a service from the network node to the terminal device. Optionally, the method according to the fifth aspect of the present disclosure may further comprise receiving a feedback transmission from the terminal device with respect to the data transmission. The feedback transmission may be in accordance with a resource configuration corresponding to a type of the service.

According to a sixth aspect of the present disclosure, there is provided an apparatus. The apparatus comprises one or more processors and one or more memories comprising computer program codes. The one or more memories and the computer program codes may be configured to, with the one or more processors, cause the apparatus at least to perform any step of the method according to the fifth aspect of the present disclosure.

According to a seventh aspect of the present disclosure, there is provided a computer-readable medium having computer program codes embodied thereon which, when executed on a computer, cause the computer to perform any step of the method according to the fifth aspect of the present disclosure.

According to an eighth aspect of the present disclosure, there is provided an apparatus. The apparatus comprises a determining unit and a providing unit. In accordance with some exemplary embodiments, the determining unit may be operable to carry out at least the determining step of the method according to the fifth aspect of the present disclosure. The providing unit may be operable to carry out at least the providing step of the method according to the fifth aspect of the present disclosure.

In accordance with an exemplary embodiment, the correspondence between the resource configurations and the different types of services may indicate that a radio resource spanning a relative shorter duration in a time domain is applicable to a feedback transmission for a type of service which has a relative higher requirement on at least one of latency and reliability.

In accordance with an exemplary embodiment, the correspondence between the resource configurations and the different types of services may indicate that a radio resource with a transmission duration shorter than a duration threshold is applicable to a feedback transmission for a type of service which requires latency of the service less than a latency threshold.

In accordance with an exemplary embodiment, the correspondence between the resource configurations and the different types of services may indicate that a radio resource with a transmission duration shorter than a duration threshold is applicable to a feedback transmission for a type of service which requires reliability of the service higher than a reliability threshold.

In accordance with an exemplary embodiment, a correspondence between the duration threshold with the latency threshold and/or the reliability threshold may be predefined or adjusted adaptively.

In accordance with an exemplary embodiment, the different types of services may be identified by metric information of the data transmissions from the network node to the terminal device.

In accordance with an exemplary embodiment, the metric information of a data transmission from the network node to the terminal device may comprise at least one of the following: a transmission duration associated with a radio resource granted for the data transmission, one or more parameters related to downlink control information (DCI) for the data transmission, and a resource indicator related to the data transmission.

In accordance with an exemplary embodiment, the one or more parameters related to the DCI may comprise at least one of the following: a downlink assignment index (DAI), a format of DCI, a search space of DCI, an indicator specified for a resource configuration of a feedback transmission, a radio network identifier, and a data check sequence.

In accordance with an exemplary embodiment, the resource indicator may comprise at least one of the following: a bandwidth part (BWP) index, and an index of one or more physical resource blocks (PRBs).

According to a ninth aspect of the present disclosure, there is provided a method implemented in a communication system which may include a host computer, a base station and a UE. The method may comprise providing user data at the host computer. Optionally, the method may comprise, at the host computer, initiating a transmission carrying the user data to the UE via a cellular network comprising the base station which may perform any step of the method according to the fifth aspect of the present disclosure.

According to a tenth aspect of the present disclosure, there is provided a communication system including a host computer. The host computer may comprise processing circuitry configured to provide user data, and a communication interface configured to forward the user data to a cellular network for transmission to a UE. The cellular network may comprise a base station having a radio interface and processing circuitry. The base station's processing circuitry may be configured to perform any step of the method according to the fifth aspect of the present disclosure.

According to an eleventh aspect of the present disclosure, there is provided a method implemented in a communication system which may include a host computer, a base station and a UE. The method may comprise providing user data at the host computer. Optionally, the method may comprise, at the host computer, initiating a transmission carrying the user data to the UE via a cellular network comprising the base station. The UE may perform any step of the method according to the first aspect of the present disclosure.

According to a twelfth aspect of the present disclosure, there is provided a communication system including a host computer. The host computer may comprise processing circuitry configured to provide user data, and a communication interface configured to forward user data to a cellular network for transmission to a UE. The UE may comprise a radio interface and processing circuitry. The UE's processing circuitry may be configured to perform any step of the method according to the first aspect of the present disclosure.

According to a thirteenth aspect of the present disclosure, there is provided a method implemented in a communication system which may include a host computer, a base station and a UE. The method may comprise, at the host computer, receiving user data transmitted to the base station from the UE which may perform any step of the method according to the first aspect of the present disclosure.

According to a fourteenth aspect of the present disclosure, there is provided a communication system including a host computer. The host computer may comprise a communication interface configured to receive user data originating from a transmission from a UE to a base station. The UE may comprise a radio interface and processing circuitry. The UE's processing circuitry may be configured to perform any step of the method according to the first aspect of the present disclosure.

According to a fifteenth aspect of the present disclosure, there is provided a method implemented in a communication system which may include a host computer, a base station and a UE. The method may comprise, at the host computer, receiving, from the base station, user data originating from a transmission which the base station has received from the UE. The base station may perform any step of the method according to the fifth aspect of the present disclosure.

According to a sixteenth aspect of the present disclosure, there is provided a communication system which may include a host computer. The host computer may comprise a communication interface configured to receive user data originating from a transmission from a UE to a base station. The base station may comprise a radio interface and processing circuitry. The base station's processing circuitry may be configured to perform any step of the method according to the fifth aspect of the present disclosure.

BRIEF DESCRIPTION OF THE DRAWINGS

The disclosure itself, the preferable mode of use and further objectives are best understood by reference to the following detailed description of the embodiments when read in conjunction with the accompanying drawings, in which.

DETAILED DESCRIPTION

Figure 1:
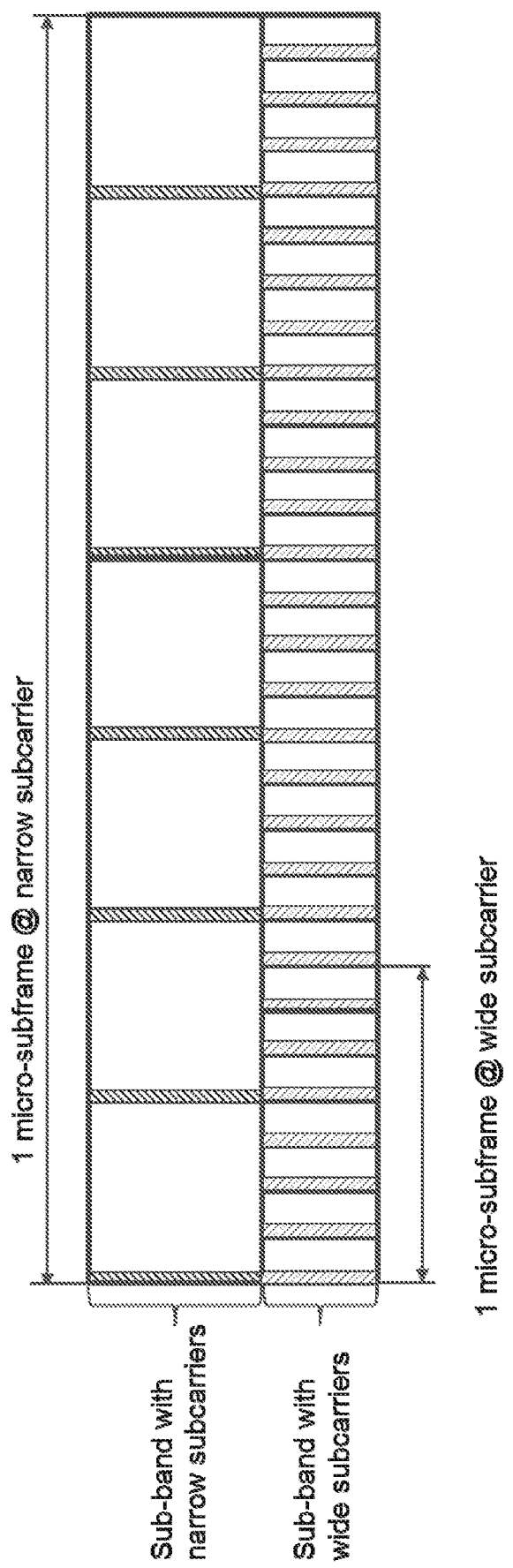
FIG. 1 is a diagram illustrating an example of mixed numerologies with the same carrier according to an embodiment of the present disclosure.

The embodiments of the present disclosure are described in detail with reference to the accompanying drawings. It should be understood that these embodiments are discussed only for the purpose of enabling those skilled persons in the art to better understand and thus implement the present disclosure, rather than suggesting any limitations on the scope of the present disclosure. Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

As used herein, the term "wireless communication network" refers to a network following any suitable communication standards, such as NR, LTE-Advanced, LTE, wideband code division multiple access (WCDMA), high-speed packet access (HSPA), and so on. Furthermore, the communications between a terminal device and a network node in the communication network may be performed according to any suitable communication protocols, including, but not limited to, the first generation (1G), the second generation (2G), 2.5G, 2.75G, the third generation (3G), 4G, 4.5G, 5G communication protocols, and/or any other protocols either currently known or to be developed in the future.

The term "network node" refers to a network device in a communication network via which a terminal device accesses to the network and receives services therefrom. The network node may refer to a base station (BS), an access point (AP), a multi-cell/multicast coordination entity (MCE), a gateway, a server, a controller or any other suitable device in a wireless communication network. The BS may be, for example, a node B (NodeB or NB), an evolved NodeB (eNodeB or eNB), a next generation NodeB (gNodeB or gNB), a remote radio unit (RRU), a radio header (RH), a remote radio head (RRH), a relay, a low power node such as a femto, a pico, and so forth.

Yet further examples of the network node comprise multi-standard radio (MSR) radio equipment such as MSR BSs, network controllers such as radio network controllers (RNCs) or base station controllers (BSCs), base transceiver stations (BTSs), transmission points, transmission nodes, positioning nodes and/or the like. More generally, however, the network node may represent any suitable device (or group of devices) capable, configured, arranged, and/or operable to enable and/or provide a terminal device access to a wireless communication network or to provide some service to a terminal device that has accessed to the wireless communication network.

The term "terminal device" refers to any end device that can access a communication network and receive services therefrom. By way of example and not limitation, the terminal device may refer to a mobile terminal, a UE, or other suitable devices. The UE may be, for example, a subscriber station, a portable subscriber station, a mobile station (MS) or an access terminal (AT). The terminal device may include, but not limited to, portable computers, image capture terminal devices such as digital cameras, gaming terminal devices, music storage and playback appliances, a mobile phone, a cellular phone, a smart phone, a tablet, a wearable device, a personal digital assistant (PDA), a vehicle, and the like.

As yet another specific example, in an Internet of things (IoT) scenario, a terminal device may represent a machine or other device that performs monitoring and/or measurements, and transmits the results of such monitoring and/or measurements to another terminal device and/or a network equipment. The terminal device may in this case be a machine-to-machine (M2M) device, which may in a 3GPP context be referred to as a machine type communication (MTC) device.

As one particular example, the terminal device may be a UE implementing the 3GPP narrow band internet of things (NB-IoT) standard. Particular examples of such machines or devices are sensors, metering devices such as power meters, industrial machinery, or home or personal appliances, e.g. refrigerators, televisions, personal wearables such as watches etc. In other scenarios, a terminal device may represent a vehicle or other equipment, for example, a medical instrument that is capable of monitoring and/or reporting on its operational status or other functions associated with its operation.

As used herein, the terms "first", "second" and so forth refer to different elements. The singular forms "a" and "an" are intended to include the plural forms as well, unless the context clearly indicates otherwise. The terms "comprises", "comprising", "has", "having", "includes" and/or "including" as used herein, specify the presence of stated features, elements, and/or components and the like, but do not preclude the presence or addition of one or more other features, elements, components and/or combinations thereof. The term "based on" is to be read as "based at least in part on". The term "one embodiment" and "an embodiment" are to be read as "at least one embodiment". The term "another embodiment" is to be read as "at least one other embodiment". Other definitions, explicit and implicit, may be included below.

As described previously, various types of services, such as URLLC, eMBB and mMTC, may be supported by a wireless communication network such as NR and LTE. Different services may have different QoS requirements in terms of delay, reliability, data rate and packet loss, etc. For example, the URLLC service requires low delay and/or high reliability, but usually it also has a low data rate and a sparse data transmission interval. The mMTC service typically requires long battery lifetime but does not require low delay or high data rate, often combined with small infrequent packets. The eMBB service requires high data rate and its requirement on delay can be strict but typically less strict than the URLLC service.

In order to fulfill requirements of different services, it may be beneficial to introduce the support of mixed numerologies within one carrier, so that the services can be served with different numerologies to achieve different transmission latency. The term "numerology" may be used to refer to some parameters related to the radio resources for signal transmissions, such as the sub-carrier spacing (SCS), the length or duration of a cyclic prefix (CP), the length or duration of an orthogonal frequency division multiplexing (OFDM) symbol, the number of symbols contained in a time slot, the time slot duration and/or the like.

In LTE, the OFDM symbols are created by using 15 kHz SCS, corresponding to the duration of 66.67 µs (without CP). In NR, similar baseline is assumed but various numerologies with other frequency spacing are also allowed, such as 30 kHz, 60 kHz and 120 kHz, and it is currently agreed to support the SCS of $2^n \times 15$ kHz (n=1, 2, 3, . . . ). These numerologies give shorter OFDM symbol durations, for example, $66.67/2^n$ µs. Thus, using n>1, each OFDM symbol is shorter in time, but wider in the occupied bandwidth.

FIG. 1 is a diagram illustrating an example of mixed numerologies with the same carrier according to an embodiment of the present disclosure. In the example as illustrated in FIG. 1, two numerologies are mixed in the same carrier, which are denoted as "sub-band with narrow subcarriers" and "sub-band with wide subcarriers" in FIG. 1, respectively. It will be appreciated that FIG. 1 merely shows two types of SCS and the corresponding micro-subframes schematically. In practice, a wireless communication network such as NR may support other SCS of $2^n \times 15$ kHz and n may be configurable.

Further, the wireless communication network such as NR also may support different PDSCH/PUSCH transmission durations using different time units such as slot and mini-slot. As an example, a slot may comprise 14 OFDM symbols, while a mini-slot may comprise 2, 4 or 7 OFDM symbols. The network can selectively use different numerologies or transmission durations to achieve service differentiation.

On the other hand, a terminal device such as a UE may receive multiple services associated with differentiated QoS requirements at the same time. The HARQ feedback transmission in uplink for the URLLC service may require a tight latency and a high transmission reliability compared to that for the eMBB service. The existing PUCCH transmissions carrying the downlink HARQ acknowledgement may be in a long PUCCH format which comprises more OFDM symbols in the time domain, or in a short PUCCH format which spans fewer OFDM symbols. The HARQ entities at the UE side and/or the network side can see only HARQ process identifiers (IDs), and would not know the service type associated with each HARQ feedback transmission. Therefore, the HARQ acknowledgement could not distinguish the types of services. For example, a HARQ acknowledgement may represent a feedback to the data transmission for both delay sensitive service and delay tolerant service. If the HARQ acknowledgement is carried via an unsuitable PUCCH format, the latency requirements for delay sensitive services may be broken correspondingly.

Therefore, it may be desirable to introduce an effective solution to configure differentiated feedback transmissions for different services. In the proposed solution according to some exemplary embodiments, a correspondence between resource configurations of feedback transmissions and different types of services may be established so as to meet different requirements, for example, in terms of reliability and/or latency. According to an exemplary embodiment, a network node such as a gNB may facilitate establishing a correspondence between a downlink data transmission and its HARQ acknowledgement in uplink (for example, via PUCCH or multiplexed with the data transmission on PUSCH) for different types of services for a terminal device such as a UE. The correspondence may be setup or determined in terms of the medium access control (MAC) and physical (PHY) metrics such as PDSCH duration, downlink assignment index (DAI) range, downlink control information (DCI) format, DCI search space, bandwidth part (BWP) index, special indicator in DCI, radio network temporary identifier (RNTI), cyclic redundancy check (CRC) sequence and/or the like. With the knowledge of such correspondence, the transmission of downlink HARQ acknowledgement for different services may be treated differently.

It is noted that some embodiments of the present disclosure are mainly described in relation to LTE or NR specifications being used as non-limiting examples for certain exemplary network configurations and system deployments. As such, the description of exemplary embodiments given herein specifically refers to terminology which is directly related thereto. Such terminology is only used in the context of the presented non-limiting examples and embodiments, and does naturally not limit the present disclosure in any way. Rather, any other system configuration or radio technologies may equally be utilized as long as exemplary embodiments described herein are applicable.

Figure 2:
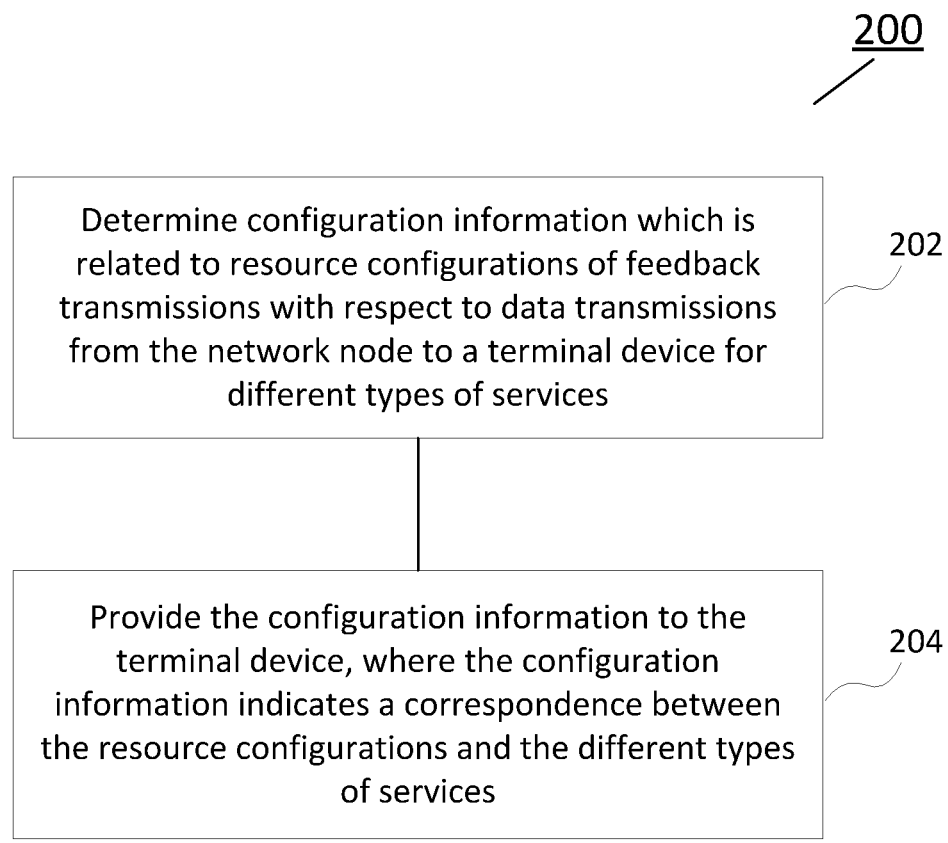
FIG. 2 is a flowchart illustrating a method according to an embodiment of the present disclosure.

FIG. 2 is a flowchart illustrating a method 200 according to an embodiment of the present disclosure. The method 200 illustrated in FIG. 2 may be performed by a network node or an apparatus communicatively coupled to the network node. In accordance with an exemplary embodiment, the network node such as a gNB may support multiple services with versatile requirements for a terminal device such as a UE. For example, the multiple services may comprise eMBB, mMTC, URLLC and/or other services which may have different QoS requirements in terms of delay, reliability, data rate and/or packet loss.

According to the exemplary method 200 illustrated in FIG. 2, the network node can determine configuration information for a terminal device, as shown in block 202. The configuration information may be related to resource configurations of feedback transmissions with respect to data transmissions from the network node to the terminal device for different types of services. In accordance with an exemplary embodiment, the resource configurations of the feedback transmissions may comprise PUCCH resource configurations for downlink HARQ acknowledgement and various types of uplink control information (UCI). For example, a PUCCH resource configuration may be identified by one or more parameters comprising at least one of a time-frequency resource, a UCI format, a demodulation reference signal (DMRS) configuration, an orthogonal cover code (OCC), etc.

It could be realized that although some exemplary embodiments of the present disclosure are mainly described in connection with the HARQ A/N transmission via the PUCCH, the resource configurations of the feedback transmissions may comprise other types of radio resource configurations, such as PUSCH resource configurations in case that the downlink HARQ acknowledgement is multiplexed with the data transmissions on the PUSCH. In this regard, the PUSCH resource configuration may be identified by one or more parameters associated with the PUSCH and/or the data transmissions on the PUSCH.

In accordance with an exemplary embodiment, the network node may provide the configuration information to the terminal device, as shown in block 204. The configuration information may indicate a correspondence between the resource configurations and the different types of services. According to an embodiment, the terminal device may be provisioned by the network node with the resource configurations such as multiple PUCCH resource configurations for downlink HARQ acknowledgement and other types of information of UCI. In particular, each resource configuration may be associated with at least one downlink logical channel and/or service. The information of the at least one downlink logical channel and/or service may be informed to PHY and HARQ entities from the MAC layer. Thus, a PUCCH resource configuration with a certain resource and format may be applied to a feedback transmission for a specific downlink service.

In accordance with an exemplary embodiment, the correspondence between the resource configurations and the different types of services may indicate that a radio resource spanning a relative shorter duration in a time domain may be applicable to a feedback transmission for a type of service which has a relative higher requirement on at least one of latency and reliability. According to an embodiment, a short PUCCH which spans a short duration (for example, by including less OFDM symbols) in the time domain can be used to carry HARQ A/N information and other UCI for a delay and/or reliability sensitive service, while a long PUCCH which spans a long duration (for example, by including more OFDM symbols) in the time domain can be used to carry HARQ A/N information and other UCI information for a delay and/or reliability non-sensitive service.

In accordance with an exemplary embodiment, the correspondence between the resource configurations and the different types of services may indicate that a radio resource with a transmission duration shorter than a duration threshold is applicable to a feedback transmission for a type of service which requires latency of the service less than a latency threshold.

Alternatively or additionally, the correspondence between the resource configurations and the different types of services may indicate that a radio resource with a transmission duration shorter than a duration threshold is applicable to a feedback transmission for a type of service which requires reliability of the service higher than a reliability threshold.

Optionally, at least one of the duration threshold, the latency threshold and the reliability threshold may be variable with different service types and/or resource configurations. For example, the duration threshold, and optionally the latency threshold and/or the reliability threshold, may be adjusted according to different resource combinations available to feedback transmissions.

In accordance with an exemplary embodiment, the latency threshold and/or the reliability threshold may be adjusted in relation to the service type. For example, a first radio resource with a transmission duration shorter than the duration threshold may be applicable to a feedback transmission for a first type of service, in the case that the network node supports the first type of service and a second type of service for the terminal device while the first type of service requires less latency compared with the second type of service. In such a case, the latency threshold may be consistent with the required latency of the second type of service. In another example, the first radio resource also may be applicable to a feedback transmission for the second type of service, in the case that the network node supports the second type of service and a third type of service for the terminal device while the second type of service requires higher reliability compared with the third type of service. In such a case, the reliability threshold may be consistent with the required reliability of the third type of service.

In accordance with an exemplary embodiment, there may be a correspondence between the duration threshold with the latency threshold and/or the reliability threshold. For example, a first duration threshold may correspond to a first latency threshold and/or a first reliability threshold. It means that a radio resource with a transmission duration shorter than the first duration threshold may be applicable to a feedback transmission for a type of service which requires latency of the service less than the first latency threshold, and/or requires reliability of the service higher than the first reliability threshold. Similarly, a second duration threshold may correspond to a second latency threshold and/or a second reliability threshold, a third duration threshold may correspond to a third latency threshold and/or a third reliability threshold, and so on.

In accordance with an exemplary embodiment, the correspondence between the duration threshold with the latency threshold and/or the reliability threshold may be predefined or adjusted adaptively. For example, a second radio resource with a transmission duration shorter than the second duration threshold may be applicable to a feedback transmission for the first type of service, in the case that the network node supports the first type of service and the second type of service for the terminal device while the first type of service requires latency of the service less than the second latency threshold compared with the second type of service. Alternatively, the second radio resource also may be applicable to a feedback transmission for the second type of service, in the case that the network node supports the second type of service and the third type of service for the terminal device while the second type of service requires latency of the service less than the third latency threshold compared with the third type of service.

In accordance with an exemplary embodiment, the different types of services may be identified by metric information of the data transmissions from the network node to the terminal device. The metric information may be related to one or more MAC and PHY metrics. According to an exemplary embodiment, the metric information of a data transmission from the network node to the terminal device may comprise at least one of the following: a transmission duration associated with a radio resource granted for the data transmission; one or more parameters related to DCI for the data transmission; and a resource indicator related to the data transmission.

According to an exemplary embodiment where a type of a service may be identified by a transmission duration associated with a radio resource granted for a downlink data transmission of the service, a resource configuration of a feedback transmission may be mapped to a type of downlink data transmission associated with a range of transmission durations. In this embodiment, a downlink logical channel and/or service with a certain QoS requirement may be supported by using a grant (such as PDSCH) associated with a transmission duration specific to the QoS requirement. For example, the downlink data for a delay and/or reliability sensitive service may be transmitted with a grant associated with a short transmission duration, while the downlink data for a delay and/or reliability tolerant service may be transmitted with a grant associated with a long transmission duration. Correspondingly, the downlink HARQ A/N feedback for the delay and/or reliability sensitive service may be transmitted with a grant (such as PUCCH) associated with a short transmission duration, while the downlink HARQ A/N feedback for the delay and/or reliability tolerant service may be transmitted with a grant associated with a long transmission duration.

According to an exemplary embodiment where a type of a service may be identified by one or more parameters related to DCI for a downlink data transmission of the service, a resource configuration of a feedback transmission may be mapped to a type of downlink data transmission associated with one or more parameters related to the DCI. In accordance with an exemplary embodiment, the one or more parameters related to the DCI may comprise a DAI, a format of DCI, a search space of DCI, an indicator specified for a resource configuration of a feedback transmission (for example, which may be included in the DCI), a radio network identifier (such as a RNTI), a data check sequence (such as a CRC sequence), and/or the like.

In an exemplary embodiment where a type of a service may be identified by a DAI or a DAI range, a resource configuration of a feedback transmission may be mapped to a type of downlink data transmission associated with a range of DAIs. For example, in case that a downlink PDSCH transmission is scheduled by DCI comprising a DAI lower than or equal to a given threshold, it can be determined that the corresponding PDSCH transmission may carry the data for a delay tolerant service. The given threshold may be predefined or preconfigured by some radio resource control (RRC) signaling. In case that a downlink PDSCH transmission is scheduled by DCI comprising a DAI above the given threshold, it can be determined that the corresponding PDSCH transmission may carry the data for a delay sensitive service. In this way, the downlink HARQ A/N feedback and optionally other types of UCI for different services may be transmitted with more suitable PUCCH resource configurations according to the determined service type.

In an exemplary embodiment where a type of a service may be identified by a format of DCI, a resource configuration of a feedback transmission may be mapped to a type of downlink data transmission associated with a specific DCI format. For example, it may be configured by the network that a scheduler at the network node may schedule services with a low delay requirement and/or a high reliability requirement via DCI type 1 while other services using DCI type 2. As such, the service type can be determined based at least in part on the DCI type or format. Accordingly, feedback transmissions for different services may be configured with more suitable resources according to the determined service type.

Alternatively or additionally, a type of a service may be identified by a DCI search space, and in this case, a resource configuration of a feedback transmission may be mapped to a type of downlink data transmission associated with a specific DCI search space. For example, different configurations of DCI search spaces may be specified to multiple services with different QoS requirements. Thus, the service type may be determined based at least in part on the specified DCI search space. According to the determined service type, a proper radio resource may be configured to the corresponding feedback transmission.

In accordance with some exemplary embodiments, a type of a service may be identified by using DCI to indicate a resource configuration of a feedback transmission directly. For example, an indicator specified for the resource configuration of the feedback transmission may be included in the DCI which carries the downlink assignment. The specific indicator can dynamically indicate which PUCCH resource configuration may be used to carry the corresponding HARQ A/N feedback for the downlink transmission.

Alternatively or additionally, a type of a service may be identified by using some DCI related information to indicate a resource configuration of a feedback transmission indirectly. For example, different radio network identifiers such as RNTIs or cell-RNTIs (C-RNTIs) may be configured for the DCI which carries the downlink assignment. Optionally, different data check sequences such as CRC sequences also may be configured for the DCI. According to a predefined correspondence between RNTIs (and/or CRC sequences) with the PUCCH resource configurations, a UE can determine which PUCCH resource configuration may be used to carry the corresponding HARQ A/N feedback and other types of UCI based at least in part on the determined RNTI and/or CRC sequence by decoding the DCI via the PDCCH.

According to an exemplary embodiment where a type of a service may be identified by a resource indicator related to a downlink data transmission, a resource configuration of a feedback transmission may be mapped to a type of downlink data transmission associated with the resource indicator. In accordance with some exemplary embodiments, the resource indicator may comprise at least one of the following: a bandwidth part (BWP) index, and an index of one or more physical resource blocks (PRBs). In this case, the correspondence between a BWP index (and/or a PRB index/PRB group index) and a PUCCH resource configuration may be preconfigured or predefined as required. Accordingly, a UE can determine which PUCCH resource configuration may be used to carry the corresponding HARQ A/N feedback and other types of UCI for a downlink data transmission based at least in part on a given BWP index and/or a PRB (or a PRB group) index for the downlink data transmission.

Optionally, according to the exemplary method 200 illustrated in FIG. 2, the network node may perform a data transmission for a service to the terminal device. The terminal device can determine a resource configuration of a feedback transmission suitable for this service, since the configuration information provided to the terminal device as described in connection with block 204 can indicate the correspondence between different resource configurations of feedback transmissions and multiple types of services. The network node thus may receive the feedback transmission from the terminal device with respect to the data transmission. The feedback transmission may be in accordance with the resource configuration corresponding to the type of this service. In this way, differentiated treatment of feedback transmissions for different services may be realized efficiently.

Figure 3:
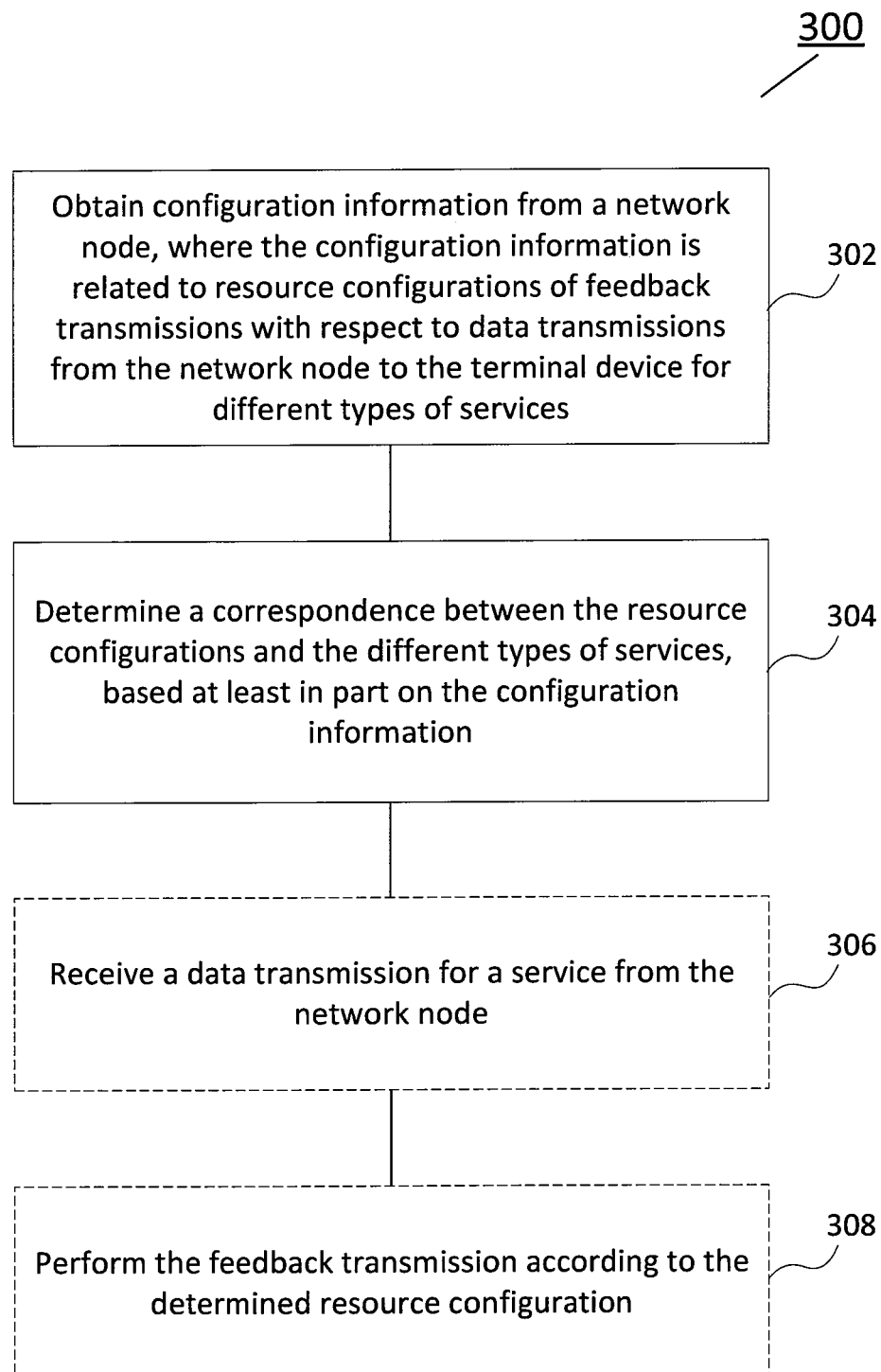
FIG. 3 is a flowchart illustrating a method according to another embodiment of the present disclosure.

FIG. 3 is a flowchart illustrating a method 300 according to another embodiment of the present disclosure. The method 300 illustrated in FIG. 3 may be performed by a terminal device or an apparatus communicatively coupled to the terminal device. In accordance with an exemplary embodiment, the terminal device such as a UE may be served by a communication network supporting multiple services such as eMBB, mMTC, URLLC and/or other services which may have different QoS requirements.

Corresponding to operations of the exemplary method 200 as illustrated in FIG. 2, the terminal device in the exemplary method 300 may obtain configuration information from a network node, as shown in block 302. As described in connection with FIG. 2, the configuration information may be related to resource configurations of feedback transmissions with respect to data transmissions from the network node to the terminal device for different types of services. For example, by receiving the configuration information from the network node such as a gNB, the terminal device such as a UE may be provisioned with multiple PUCCH resource configurations for downlink HARQ acknowledgement and other types of information of UCI.

Based at least in part on the configuration information, the terminal device can determine a correspondence between the resource configurations and the different types of services, as shown in block 304. According to the correspondence between the resource configurations and the different types of services, the terminal device may know that a radio resource spanning a relative longer duration in a time domain may be applicable to a feedback transmission for a type of service which has a relative lower requirement on at least one of latency and reliability.

As illustrated with respect to FIG. 2, a service type may be identified by some metric information of the downlink data transmission, for example, a transmission duration associated with a radio resource granted for the downlink data transmission, one or more parameters related to DCI for the downlink data transmission, a resource indicator related to the downlink data transmission, and/or any other suitable metric parameters.

Optionally, the terminal device such as a UE may receive a data transmission (for example, via a PDSCH) for a service from the network node such as a gNB, as shown in block 306. By using metric information of the received data transmission, the terminal device can identify a type of the service. Based at least in part on the identified type of the service and the correspondence between the resource configurations and the different types of services, the terminal device can determine a resource configuration of a feedback transmission with respect to the received data transmission.

Optionally, the feedback transmission may be performed by the terminal device according to the determined resource configuration, as shown in block 308. In accordance with an exemplary embodiment, the terminal device such as the UE can determine a PUCCH resource configuration for a HARQ A/N feedback of a PDSCH transmission according to an association between the PDSCH transmission and the corresponding service type. Then the UE can transmit the HARQ A/N feedback to the gNB by using the determined PUCCH resource configuration.

It will be realized that parameters, variables, information element and settings related to multiple services and the corresponding feedback transmissions described herein are just examples. Other suitable parameter settings, the associated configuration parameters and the specific values thereof may also be applicable to implement the proposed methods.

The proposed solution according to one or more exemplary embodiments can enable feedback transmissions such as HARQ acknowledgement for different services to be treated differently. Taking the advantage of the proposed resource configuration mechanism makes it possible to establish a correspondence between a downlink data transmission and its HARQ acknowledgement in uplink, for example, via a PUCCH or multiplexed with the data transmission on a PUSCH, for different types of services for a UE. In this way, the UE may be able to perform differentiated HARQ A/N feedback transmissions so as to fulfill various delay and/or reliability requirements of different services.

The various blocks shown in FIGS. 2-3 may be viewed as method steps, and/or as operations that result from operation of computer program code, and/or as a plurality of coupled logic circuit elements constructed to carry out the associated function(s). The schematic flow chart diagrams described above are generally set forth as logical flow chart diagrams. As such, the depicted order and labeled steps are indicative of specific embodiments of the presented methods. Other steps and methods may be conceived that are equivalent in function, logic, or effect to one or more steps, or portions thereof, of the illustrated methods. Additionally, the order in which a particular method occurs may or may not strictly adhere to the order of the corresponding steps shown.

Figure 4:
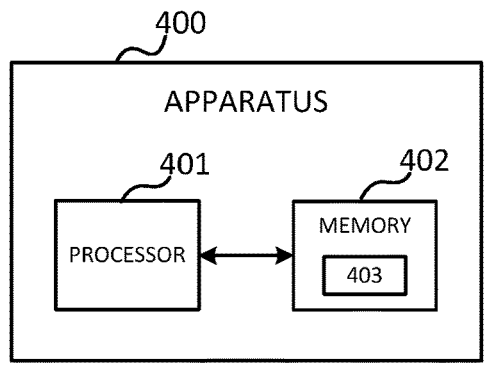
FIG. 4 is a block diagram illustrating an apparatus according to some embodiments of the present disclosure.

FIG. 4 is a block diagram illustrating an apparatus 400 according to various embodiments of the present disclosure. As shown in FIG. 4, the apparatus 400 may comprise one or more processors such as processor 401 and one or more memories such as memory 402 storing computer program codes 403. The memory 402 may be non-transitory machine/ processor/computer readable storage medium. In some implementations, the one or more memories 402 and the computer program codes 403 may be configured to, with the one or more processors 401, cause the apparatus 400 at least to perform any operation of the method as described in connection with FIG. 2. In other implementations, the one or more memories 402 and the computer program codes 403 may be configured to, with the one or more processors 401, cause the apparatus 400 at least to perform any operation of the method as described in connection with FIG. 3.

Alternatively or additionally, the one or more memories 402 and the computer program codes 403 may be configured to, with the one or more processors 401, cause the apparatus 400 at least to perform more or less operations to implement the proposed methods according to the exemplary embodiments of the present disclosure.

Figure 5:
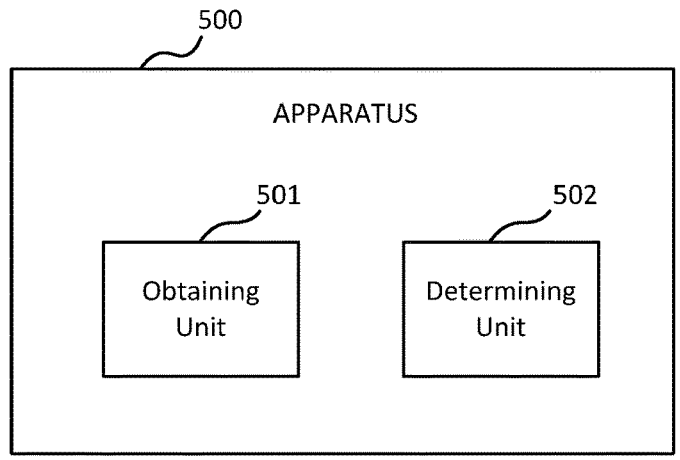
FIG. 5 is a block diagram illustrating an apparatus according to an embodiment of the present disclosure.

FIG. 5 is a block diagram illustrating an apparatus 500 according to an embodiment of the present disclosure. As shown in FIG. 5, the apparatus 500 may comprise an obtaining unit 501 and a determining unit 502. In an exemplary embodiment, the apparatus 500 may be implemented at a terminal device such as a UE. The obtaining unit 501 may be operable to carry out the operation in block 302, and the determining unit 502 may be operable to carry out the operation in block 304. Optionally, the obtaining unit 501 and/or the determining unit 502 may be operable to carry out more or less operations to implement the proposed methods according to the exemplary embodiments of the present disclosure.

Figure 6:
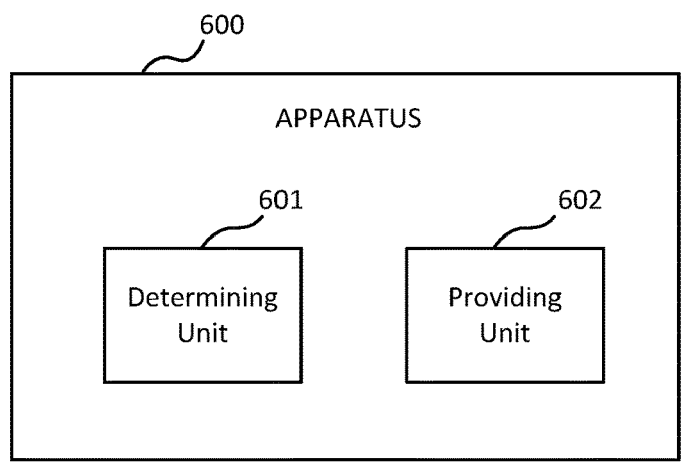
FIG. 6 is a block diagram illustrating an apparatus according to another embodiment of the present disclosure.

FIG. 6 is a block diagram illustrating an apparatus 600 according to another embodiment of the present disclosure. As shown in FIG. 6, the apparatus 600 may comprise a determining unit 601 and a providing unit 602. In an exemplary embodiment, the apparatus 600 may be implemented at a network node such as a gNB. The determining unit 601 may be operable to carry out the operation in block 202, and the providing unit 602 may be operable to carry out the operation in block 204. Optionally, the determining unit 601 and/or the providing unit 602 may be operable to carry out more or less operations to implement the proposed methods according to the exemplary embodiments of the present disclosure.

Figure 7:
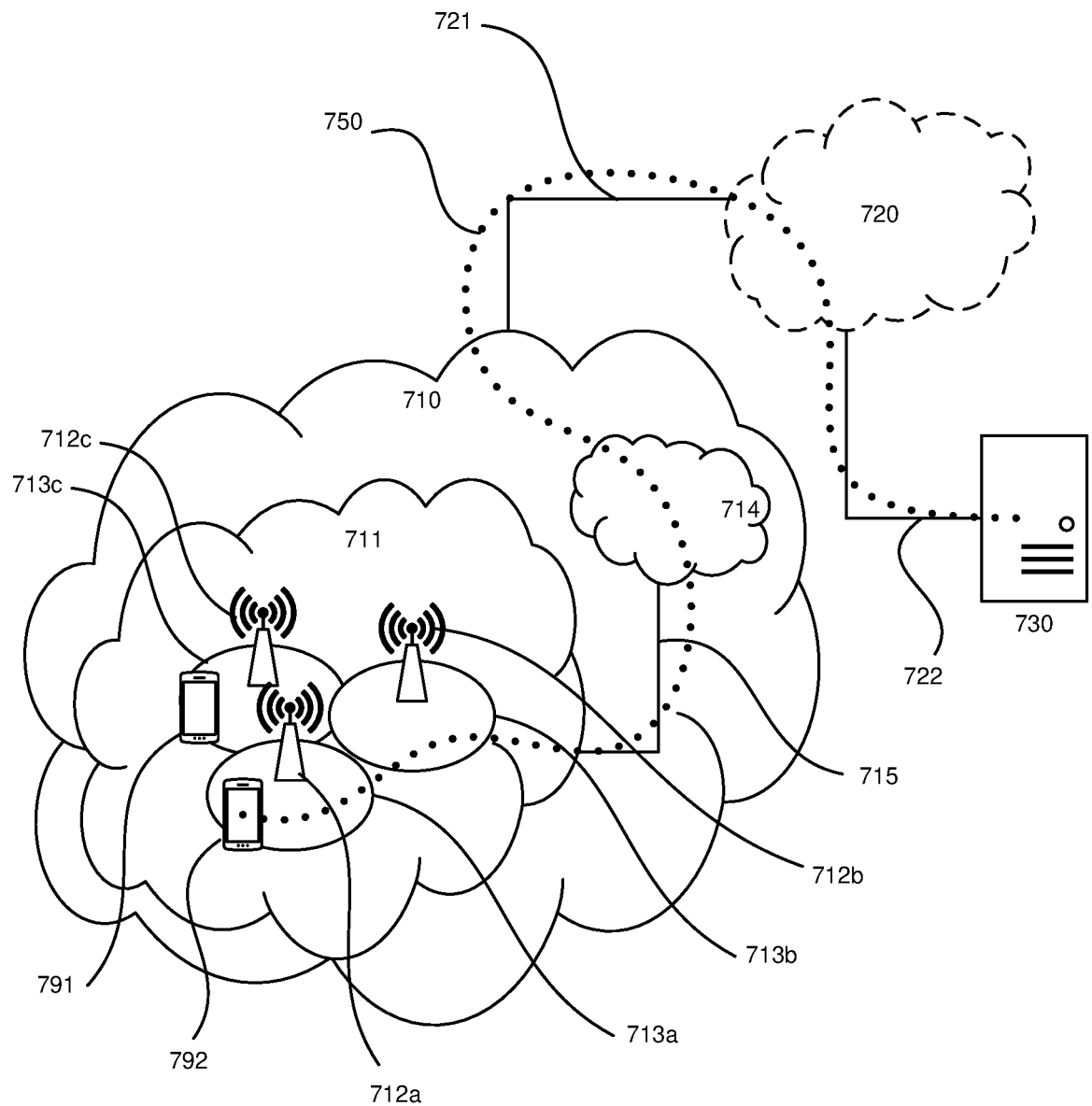
FIG. 7 is a block diagram illustrating a telecommunication network connected via an intermediate network to a host computer in accordance with some embodiments of the present disclosure.

FIG. 7 is a block diagram illustrating a telecommunication network connected via an intermediate network to a host computer in accordance with some embodiments of the present disclosure.

With reference to FIG. 7, in accordance with an embodiment, a communication system includes a telecommunication network 710, such as a 3GPP-type cellular network, which comprises an access network 711, such as a radio access network, and a core network 714. The access network 711 comprises a plurality of base stations 712a, 712b, 712c, such as NBs, eNBs, gNBs or other types of wireless access points, each defining a corresponding coverage area 713a, 713b, 713c. Each base station 712a, 712b, 712c is connectable to the core network 714 over a wired or wireless connection 715. A first UE 791 located in a coverage area 713c is configured to wirelessly connect to, or be paged by, the corresponding base station 712c. A second UE 792 in a coverage area 713a is wirelessly connectable to the corresponding base station 712a. While a plurality of UEs 791, 792 are illustrated in this example, the disclosed embodiments are equally applicable to a situation where a sole UE is in the coverage area or where a sole UE is connecting to the corresponding base station 712.

The telecommunication network 710 is itself connected to a host computer 730, which may be embodied in the hardware and/or software of a standalone server, a cloud-implemented server, a distributed server or as processing resources in a server farm. The host computer 730 may be under the ownership or control of a service provider, or may be operated by the service provider or on behalf of the service provider. Connections 721 and 722 between the telecommunication network 710 and the host computer 730 may extend directly from the core network 714 to the host computer 730 or may go via an optional intermediate network 720. An intermediate network 720 may be one of, or a combination of more than one of, a public, private or hosted network; the intermediate network 720, if any, may be a backbone network or the Internet; in particular, the intermediate network 720 may comprise two or more sub-networks (not shown).

The communication system of FIG. 7 as a whole enables connectivity between the connected UEs 791, 792 and the host computer 730. The connectivity may be described as an over-the-top (OTT) connection 750. The host computer 730 and the connected UEs 791, 792 are configured to communicate data and/or signaling via the OTT connection 750, using the access network 711, the core network 714, any intermediate network 720 and possible further infrastructure (not shown) as intermediaries. The OTT connection 750 may be transparent in the sense that the participating communication devices through which the OTT connection 750 passes are unaware of routing of uplink and downlink communications. For example, the base station 712 may not or need not be informed about the past routing of an incoming downlink communication with data originating from the host computer 730 to be forwarded (e.g., handed over) to a connected UE 791. Similarly, the base station 712 need not be aware of the future routing of an outgoing uplink communication originating from the UE 791 towards the host computer 730.

Figure 8:
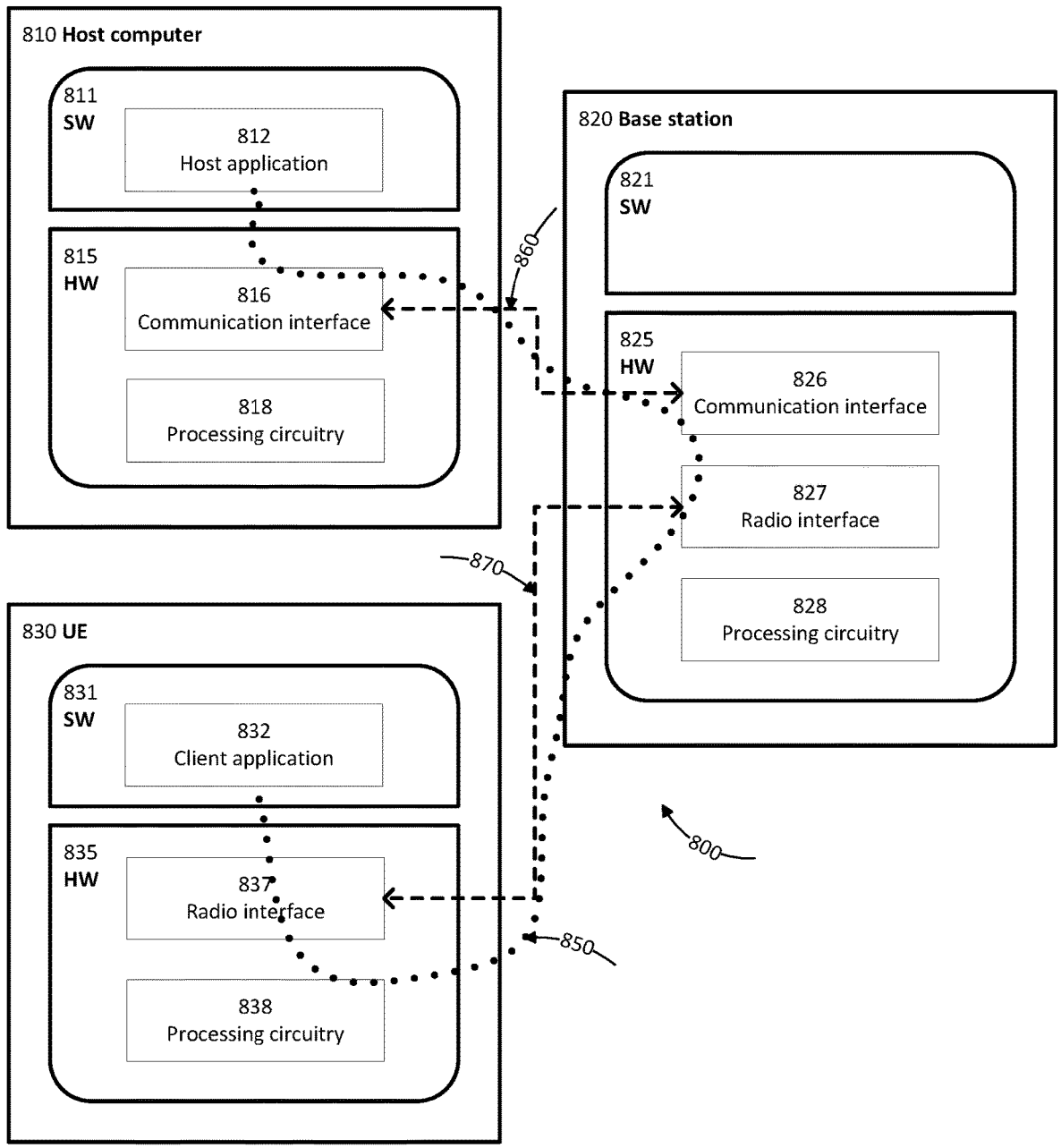
FIG. 8 is a block diagram illustrating a host computer communicating via a base station with a UE over a partially wireless connection in accordance with some embodiments of the present disclosure.

FIG. 8 is a block diagram illustrating a host computer communicating via a base station with a UE over a partially wireless connection in accordance with some embodiments of the present disclosure.

Example implementations, in accordance with an embodiment, of the UE, base station and host computer discussed in the preceding paragraphs will now be described with reference to FIG. 8. In a communication system 800, a host computer 810 comprises hardware 815 including a communication interface 816 configured to set up and maintain a wired or wireless connection with an interface of a different communication device of the communication system 800. The host computer 810 further comprises a processing circuitry 818, which may have storage and/or processing capabilities. In particular, the processing circuitry 818 may comprise one or more programmable processors, application-specific integrated circuits, field programmable gate arrays or combinations of these (not shown) adapted to execute instructions. The host computer 810 further comprises software 811, which is stored in or accessible by the host computer 810 and executable by the processing circuitry 818. The software 811 includes a host application 812. The host application 812 may be operable to provide a service to a remote user, such as UE 830 connecting via an OTT connection 850 terminating at the UE 830 and the host computer 810. In providing the service to the remote user, the host application 812 may provide user data which is transmitted using the OTT connection 850.

The communication system 800 further includes a base station 820 provided in a telecommunication system and comprising hardware 825 enabling it to communicate with the host computer 810 and with the UE 830. The hardware 825 may include a communication interface 826 for setting up and maintaining a wired or wireless connection with an interface of a different communication device of the communication system 800, as well as a radio interface 827 for setting up and maintaining at least a wireless connection 870 with the UE 830 located in a coverage area (not shown in FIG. 8) served by the base station 820. The communication interface 826 may be configured to facilitate a connection 860 to the host computer 810. The connection 860 may be direct or it may pass through a core network (not shown in FIG. 8) of the telecommunication system and/or through one or more intermediate networks outside the telecommunication system. In the embodiment shown, the hardware 825 of the base station 820 further includes a processing circuitry 828, which may comprise one or more programmable processors, application-specific integrated circuits, field programmable gate arrays or combinations of these (not shown) adapted to execute instructions. The base station 820 further has software 821 stored internally or accessible via an external connection.

The communication system 800 further includes the UE 830 already referred to. Its hardware 835 may include a radio interface 837 configured to set up and maintain a wireless connection 870 with a base station serving a coverage area in which the UE 830 is currently located. The hardware 835 of the UE 830 further includes a processing circuitry 838, which may comprise one or more programmable processors, application-specific integrated circuits, field programmable gate arrays or combinations of these (not shown) adapted to execute instructions. The UE 830 further comprises software 831, which is stored in or accessible by the UE 830 and executable by the processing circuitry 838. The software 831 includes a client application 832. The client application 832 may be operable to provide a service to a human or non-human user via the UE 830, with the support of the host computer 810. In the host computer 810, an executing host application 812 may communicate with the executing client application 832 via the OTT connection 850 terminating at the UE 830 and the host computer 810. In providing the service to the user, the client application 832 may receive request data from the host application 812 and provide user data in response to the request data. The OTT connection 850 may transfer both the request data and the user data. The client application 832 may interact with the user to generate the user data that it provides.

It is noted that the host computer 810, the base station 820 and the UE 830 illustrated in FIG. 8 may be similar or identical to the host computer 730, one of base stations 712a, 712b, 712c and one of UEs 791, 792 of FIG. 7, respectively. This is to say, the inner workings of these entities may be as shown in FIG. 8 and independently, the surrounding network topology may be that of FIG. 7.

In FIG. 8, the OTT connection 850 has been drawn abstractly to illustrate the communication between the host computer 810 and the UE 830 via the base station 820, without explicit reference to any intermediary devices and the precise routing of messages via these devices. Network infrastructure may determine the routing, which it may be configured to hide from the UE 830 or from the service provider operating the host computer 810, or both. While the OTT connection 850 is active, the network infrastructure may further take decisions by which it dynamically changes the routing (e.g., on the basis of load balancing consideration or reconfiguration of the network).

Wireless connection 870 between the UE 830 and the base station 820 is in accordance with the teachings of the embodiments described throughout this disclosure. One or more of the various embodiments improve the performance of OTT services provided to the UE 830 using the OTT connection 850, in which the wireless connection 870 forms the last segment. More precisely, the teachings of these embodiments may improve the latency and the power consumption, and thereby provide benefits such as lower complexity, reduced time required to access a cell, better responsiveness, extended battery lifetime, etc.

A measurement procedure may be provided for the purpose of monitoring data rate, latency and other factors on which the one or more embodiments improve. There may further be an optional network functionality for reconfiguring the OTT connection 850 between the host computer 810 and the UE 830, in response to variations in the measurement results. The measurement procedure and/or the network functionality for reconfiguring the OTT connection 850 may be implemented in software 811 and hardware 815 of the host computer 810 or in software 831 and hardware 835 of the UE 830, or both. In embodiments, sensors (not shown) may be deployed in or in association with communication devices through which the OTT connection 850 passes; the sensors may participate in the measurement procedure by supplying values of the monitored quantities exemplified above, or supplying values of other physical quantities from which the software 811, 831 may compute or estimate the monitored quantities. The reconfiguring of the OTT connection 850 may include message format, retransmission settings, preferred routing etc.; the reconfiguring need not affect the base station 820, and it may be unknown or imperceptible to the base station 820. Such procedures and functionalities may be known and practiced in the art. In certain embodiments, measurements may involve proprietary UE signaling facilitating the host computer 810's measurements of throughput, propagation times, latency and the like. The measurements may be implemented in that the software 811 and 831 causes messages to be transmitted, in particular empty or 'dummy' messages, using the OTT connection 850 while it monitors propagation times, errors etc.

Figure 9:
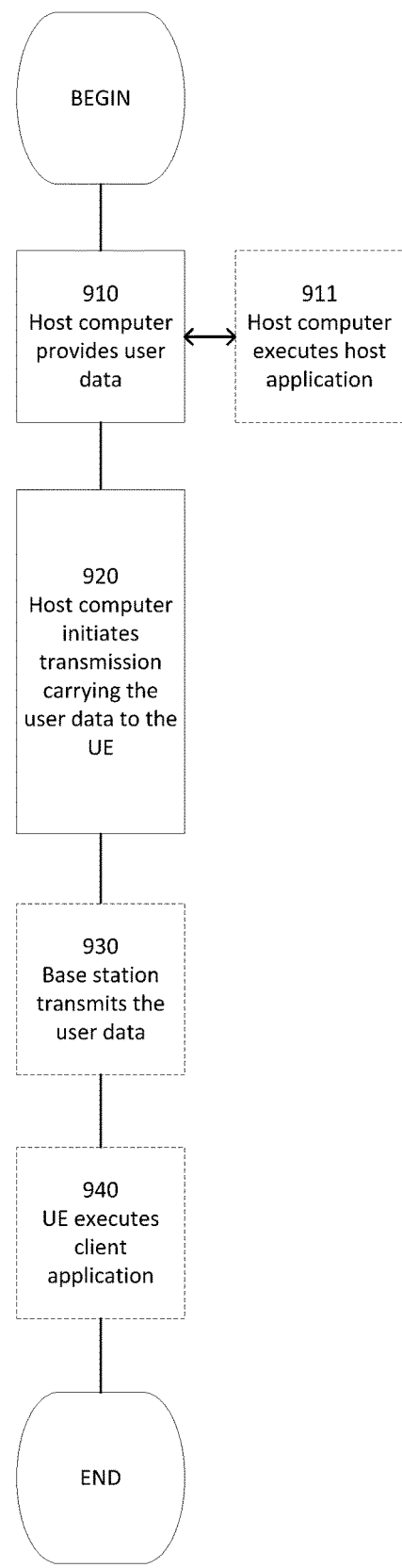
FIG. 9 is a flowchart illustrating a method implemented in a communication system, in accordance with an embodiment of the present disclosure.

FIG. 9 is a flowchart illustrating a method implemented in a communication system, in accordance with an embodiment. The communication system includes a host computer, a base station and a UE which may be those described with reference to FIG. 7 and FIG. 8. For simplicity of the present disclosure, only drawing references to FIG. 9 will be included in this section. In step 910, the host computer provides user data. In substep 911 (which may be optional) of step 910, the host computer provides the user data by executing a host application. In step 920, the host computer initiates a transmission carrying the user data to the UE. In step 930 (which may be optional), the base station transmits to the UE the user data which was carried in the transmission that the host computer initiated, in accordance with the teachings of the embodiments described throughout this disclosure. In step 940 (which may also be optional), the UE executes a client application associated with the host application executed by the host computer.

Figure 10:
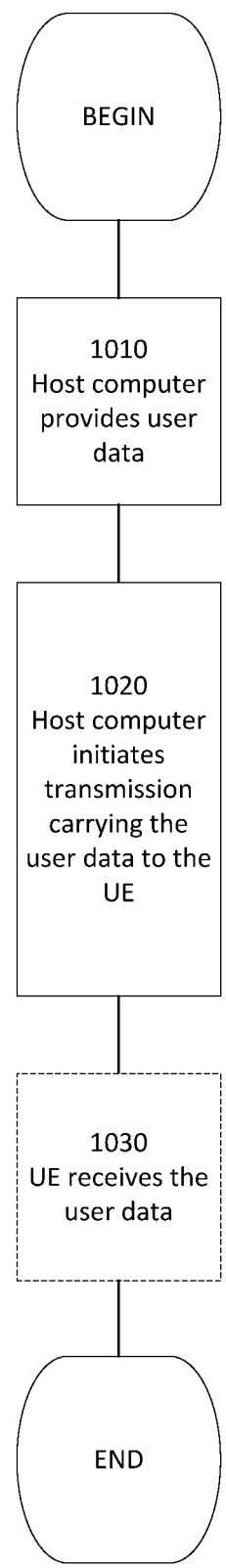
FIG. 10 is a flowchart illustrating a method implemented in a communication system, in accordance with an embodiment of the present disclosure.

FIG. 10 is a flowchart illustrating a method implemented in a communication system, in accordance with an embodiment. The communication system includes a host computer, a base station and a UE which may be those described with reference to FIG. 7 and FIG. 8. For simplicity of the present disclosure, only drawing references to FIG. 10 will be included in this section. In step 1010 of the method, the host computer provides user data. In an optional substep (not shown) the host computer provides the user data by executing a host application. In step 1020, the host computer initiates a transmission carrying the user data to the UE. The transmission may pass via the base station, in accordance with the teachings of the embodiments described throughout this disclosure. In step 1030 (which may be optional), the UE receives the user data carried in the transmission.

Figure 11:
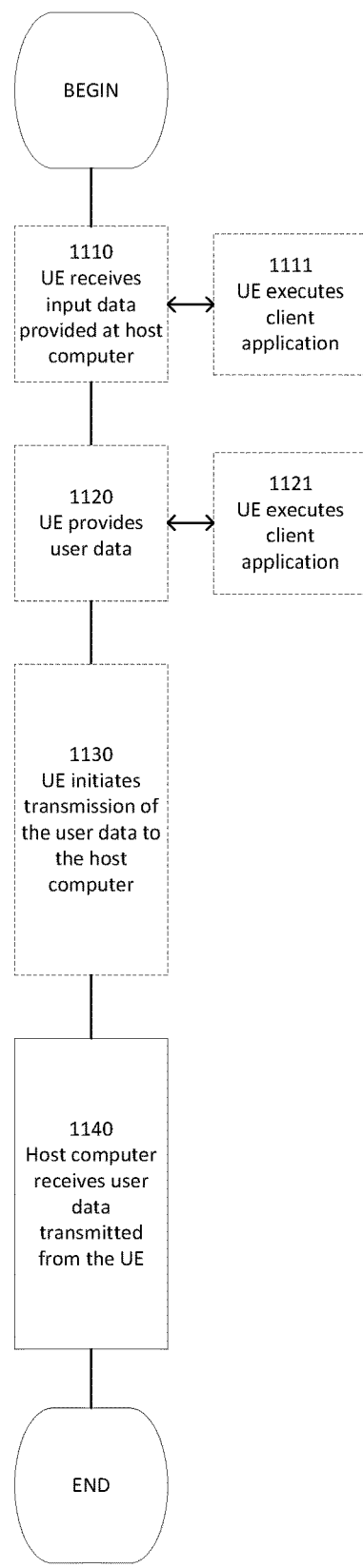
FIG. 11 is a flowchart illustrating a method implemented in a communication system, in accordance with an embodiment of the present disclosure.

FIG. 11 is a flowchart illustrating a method implemented in a communication system, in accordance with an embodiment. The communication system includes a host computer, a base station and a UE which may be those described with reference to FIG. 7 and FIG. 8. For simplicity of the present disclosure, only drawing references to FIG. 11 will be included in this section. In step 1110 (which may be optional), the UE receives input data provided by the host computer. Additionally or alternatively, in step 1120, the UE provides user data. In substep 1121 (which may be optional) of step 1120, the UE provides the user data by executing a client application. In substep 1111 (which may be optional) of step 1110, the UE executes a client application which provides the user data in reaction to the received input data provided by the host computer. In providing the user data, the executed client application may further consider user input received from the user. Regardless of the specific manner in which the user data was provided, the UE initiates, in substep 1130 (which may be optional), transmission of the user data to the host computer. In step 1140 of the method, the host computer receives the user data transmitted from the UE, in accordance with the teachings of the embodiments described throughout this disclosure.

Figure 12:
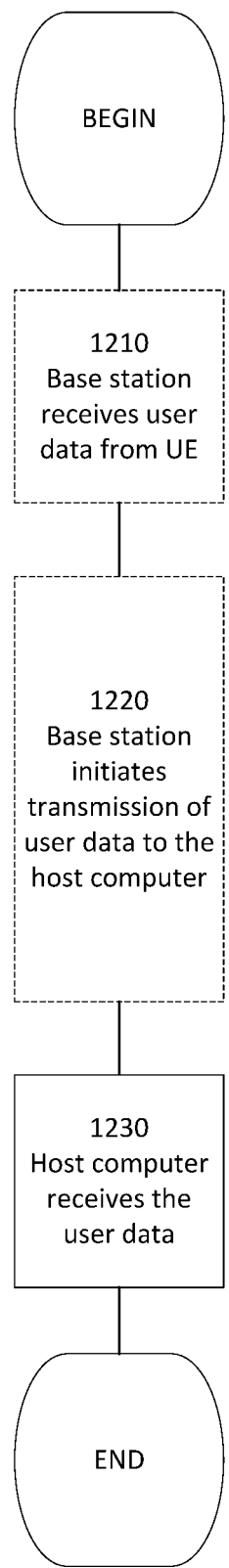
FIG. 12 is a flowchart illustrating a method implemented in a communication system, in accordance with an embodiment of the present disclosure.

FIG. 12 is a flowchart illustrating a method implemented in a communication system, in accordance with an embodiment. The communication system includes a host computer, a base station and a UE which may be those described with reference to FIG. 7 and FIG. 8. For simplicity of the present disclosure, only drawing references to FIG. 12 will be included in this section. In step 1210 (which may be optional), in accordance with the teachings of the embodiments described throughout this disclosure, the base station receives user data from the UE. In step 1220 (which may be optional), the base station initiates transmission of the received user data to the host computer. In step 1230 (which may be optional), the host computer receives the user data carried in the transmission initiated by the base station.

In general, the various exemplary embodiments may be implemented in hardware or special purpose chips, circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, random access memory (RAM), etc. As will be appreciated by one of skill in the art, the function of the program modules may be combined or distributed as desired in various embodiments. In addition, the function may be embodied in whole or partly in firmware or hardware equivalents such as integrated circuits, field programmable gate arrays (FPGA), and the like.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-limiting and exemplary embodiments of this disclosure.

What is claimed is:

1. A method performed by a terminal device, wherein the terminal device is capable of receiving multiple services with respective differentiated Quality of Service (QoS) at a same time, in which the differentiated QoS is differentiated based on at least one of latency and reliability, the method comprising:

receiving configuration information from a network node, wherein the configuration information is related to resource configurations of Hybrid Automatic Repeat Request (HARQ) feedback transmissions with respect to data transmissions from the network node to the terminal device for different types of services associated with the differentiated QoS; and determining a correspondence between the resource configurations and the different types of services, based at least in part on the configuration information, wherein the correspondence indicates resources that are applicable to the HARQ feedback transmissions for the differentiated QoS, in order for the terminal device to transmit the HARQ feedback transmissions in a physical uplink control channel (PUCCH) or a physical uplink shared channel (PUSCH) having a time duration determined by the differentiated QoS.

2. The method according to claim 1, wherein the correspondence between the resource configurations and the different types of services indicates that:

a radio resource with a transmission duration shorter than a first duration threshold is applicable to a HARQ feedback transmission for a type of service which requires latency of the service less than a latency threshold; or a radio resource with a transmission duration shorter than a second duration threshold is applicable to a HARQ feedback transmission for a type of service which requires reliability of the service higher than a reliability threshold.

3. The method according to claim 1, wherein the different types of services are identified by metric information of the data transmissions from the network node to the terminal device.

4. The method according to claim 3, wherein the metric information of a data transmission from the network node to the terminal device comprises at least one of the following:
   a transmission duration associated with a radio resource granted for the data transmission;
   one or more parameters related to downlink control information for the data transmission; and
   a resource indicator related to the data transmission.

5. The method according to claim 4, wherein the one or more parameters related to the downlink control information comprise at least one of the following:
   a downlink assignment index;
   a format of downlink control information;
   a search space of downlink control information;
   an indicator specified for a resource configuration of a HARQ feedback transmission;
   a radio network identifier; and
   a data check sequence.

6. The method according to claim 4, wherein the resource indicator comprises at least one of the following:
   a bandwidth part index; and
   an index of one or more physical resource blocks.

7. The method according to claim 1, further comprising:
   receiving a data transmission for a service from the network node; and
   identifying a type of the service by using metric information of the received data transmission.

8. The method according to claim 7, further comprising:
   determining a resource configuration of a HARQ feedback transmission with respect to the received data transmission, based at least in part on the identified type of the service and the correspondence between the resource configurations and the different types of services; and
   performing the HARQ feedback transmission according to the determined resource configuration.

9. An apparatus operating as a terminal device, wherein the apparatus is capable of receiving multiple services with respective differentiated Quality of Service (QoS) at a same time, in which the differentiated QoS is differentiated based on at least one of latency and reliability, the apparatus comprising:
   one or more processors; and
   one or more memories containing computer program codes which, when executed by the one or more processors, cause the apparatus to:
      receive configuration information from a network node, wherein the configuration information is related to resource configurations of Hybrid Automatic Repeat Request (HARQ) feedback transmissions with respect to data transmissions from the network node to the apparatus for different types of services associated with the differentiated QoS; and
      determine a correspondence between the resource configurations and the different types of services, based at least in part on the configuration information, wherein the correspondence indicates resources that are applicable to the HARQ feedback transmissions for the differentiated QoS, in order for the apparatus to transmit the HARQ feedback transmissions in a physical uplink control channel (PUCCH) or a physical uplink shared channel (PUSCH) having a time duration determined by the differentiated QoS.

10. The apparatus according to claim 9, wherein the correspondence between the resource configurations and the different types of services indicates that:
   a radio resource with a transmission duration shorter than a first duration threshold is applicable to a HARQ feedback transmission for a type of service which requires latency of the service less than a latency threshold; or
   a radio resource with a transmission duration shorter than a second duration threshold is applicable to a HARQ feedback transmission for a type of service which requires reliability of the service higher than a reliability threshold.

11. The apparatus according to claim 9, wherein the different types of services are identified by metric information of the data transmissions from the network node to the apparatus.

12. The apparatus according to claim 11, wherein the metric information of a data transmission from the network node to the apparatus comprises at least one of the following:
   a transmission duration associated with a radio resource granted for the data transmission;
   one or more parameters related to downlink control information for the data transmission; and
   a resource indicator related to the data transmission.

13. A method performed by a network node, wherein the network node is capable of transmitting multiple services with respective differentiated Quality of Service (QoS) at a same time, in which the differentiated QoS is differentiated based on at least one of latency and reliability, the method comprising:
   determining configuration information which is related to resource configurations of Hybrid Automatic Repeat Request (HARQ) feedback transmissions with respect to data transmissions from the network node to a terminal device for different types of services associated with the differentiated QoS; and
   providing the configuration information to the terminal device, wherein the configuration information indicates a correspondence between the resource configurations and the different types of services, wherein the correspondence indicates resources that are applicable to the HARQ feedback transmissions for the differentiated QoS, in order for the terminal device to transmit the HARQ feedback transmissions in a physical uplink control channel (PUCCH) or a physical uplink shared channel (PUSCH) having a time duration determined by the differentiated QoS.

14. The method according to claim 13, wherein the correspondence between the resource configurations and the different types of services indicates that a radio resource with a transmission duration shorter than a duration threshold is applicable to a HARQ feedback transmission for a type of service which requires latency of the service less than a latency threshold.

15. The method according to claim 13, wherein the correspondence between the resource configurations and the different types of services indicates that a radio resource with a transmission duration shorter than a duration threshold is applicable to a HARQ feedback transmission for a type of service which requires reliability of the service higher than a reliability threshold.

16. The method according to claim 13, wherein the different types of services are identified by metric information of the data transmissions from the network node to the terminal device.

17. The method according to claim 16, wherein the metric information of a data transmission from the network node to the terminal device comprises at least one of the following:
   a transmission duration associated with a radio resource granted for the data transmission;
   one or more parameters related to downlink control information for the data transmission; and
   a resource indicator related to the data transmission.

18. The method according to claim 17, wherein the one or more parameters related to the downlink control information comprise at least one of the following:
   a downlink assignment index;
   a format of downlink control information;
   a search space of downlink control information;
   an indicator specified for a resource configuration of a HARQ feedback transmission;
   a radio network identifier; and
   a data check sequence.

19. The method according to claim 17, wherein the resource indicator comprises at least one of the following:
   a bandwidth part index; and
   an index of one or more physical resource blocks.

20. The method according to claim 13, further comprising:
   performing a data transmission for a service from the network node to the terminal device; and
   receiving a HARQ feedback transmission from the terminal device with respect to the data transmission, wherein the HARQ feedback transmission is in accordance with a resource configuration corresponding to a type of the service.

21. An apparatus of a network node, wherein the apparatus is capable of transmitting multiple services with respective differentiated Quality of Service (QoS) at a same time, in which the differentiated QoS is differentiated based on at least one of latency and reliability, the apparatus comprising:
   one or more processors; and
   one or more memories containing computer program codes which, when executed by the one or more processors, cause the apparatus to:
      determine configuration information which is related to resource configurations of Hybrid Automatic Repeat Request (HARQ) feedback transmissions with respect to data transmissions from the apparatus to a terminal device for different types of services associated with the differentiated QoS; and
      provide the configuration information to the terminal device, wherein the configuration information indicates a correspondence between the resource configurations and the different types of services, wherein the correspondence indicates resources that are applicable to the HARQ feedback transmissions for the differentiated QoS, in order for the terminal device to transmit the HARQ feedback transmissions in a physical uplink control channel (PUCCH) or a physical uplink shared channel (PUSCH) having a time duration determined by the differentiated QoS.

22. The apparatus according to claim 21, wherein the correspondence between the resource configurations and the different types of services indicates that a radio resource with a transmission duration shorter than a duration threshold is applicable to a HARQ feedback transmission for a type of service which requires latency of the service less than a latency threshold.

23. The apparatus according to claim 21, wherein the correspondence between the resource configurations and the different types of services indicates that a radio resource with a transmission duration shorter than a duration threshold is applicable to a HARQ feedback transmission for a type of service which requires reliability of the service higher than a reliability threshold.

24. The apparatus according to claim 21, wherein the different types of services are identified by metric information of the data transmissions from the apparatus to the terminal device.

25. The apparatus according to claim 24, wherein the metric information of a data transmission from the apparatus to the terminal device comprises at least one of the following:
   a transmission duration associated with a radio resource granted for the data transmission;
   one or more parameters related to downlink control information for the data transmission; and
   a resource indicator related to the data transmission.

* * * * *